(12) United States Patent
Furiya et al.

(10) Patent No.: US 11,264,834 B2
(45) Date of Patent: Mar. 1, 2022

(54) COIL APPARATUS

(71) Applicant: IHI Corporation, Tokyo (JP)

(72) Inventors: Kentaro Furiya, Tokyo (JP); Kenji Nishimura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 596 days.

(21) Appl. No.: 16/069,189

(22) PCT Filed: Feb. 13, 2017

(86) PCT No.: PCT/JP2017/005181
§ 371 (c)(1),
(2) Date: Jul. 11, 2018

(87) PCT Pub. No.: WO2017/159167
PCT Pub. Date: Sep. 21, 2017

(65) Prior Publication Data
US 2019/0006094 A1     Jan. 3, 2019

(30) Foreign Application Priority Data

Mar. 14, 2016    (JP) .............................. JP2016-050060

(51) Int. Cl.
| | |
|---|---|
| *H01F 27/02* | (2006.01) |
| *H02J 50/00* | (2016.01) |
| *H02J 50/70* | (2016.01) |
| *H01F 27/28* | (2006.01) |
| *H02J 50/12* | (2016.01) |

(Continued)

(52) U.S. Cl.
CPC .......... *H02J 50/005* (2020.01); *B60L 53/122* (2019.02); *B60L 53/126* (2019.02); *B60L 53/30* (2019.02); *H01F 27/04* (2013.01); *H01F 27/06* (2013.01); *H01F 27/24* (2013.01); *H01F 27/255* (2013.01); *H01F 27/2823* (2013.01); *H01F 27/2871* (2013.01); *H01F 27/34* (2013.01); *H01F 38/14* (2013.01); *H02J 7/025* (2013.01);
(Continued)

(58) Field of Classification Search
USPC .................................................... 336/65, 200
See application file for complete search history.

(56) References Cited

U.S. PATENT DOCUMENTS

| | | |
|---|---|---|
| 6,388,548 B1 | 5/2002 | Saito et al. |
| 2012/0154086 A1* | 6/2012 | Willemsen .............. H01F 38/14 335/299 |

(Continued)

FOREIGN PATENT DOCUMENTS

| | | |
|---|---|---|
| CN | 102906828 A | 1/2013 |
| CN | 203366973 U | 12/2013 |

(Continued)

*Primary Examiner* — Shawki S Ismail
*Assistant Examiner* — Kazi S Hossain
(74) *Attorney, Agent, or Firm* — Volpe Koenig

(57) ABSTRACT

A coil apparatus includes a base having a front surface and a rear surface, a magnetic portion provided on a side of the front surface of the base, and a coil portion which is provided on an opposite side from the base with respect to the magnetic portion and includes a conductive wire. The magnetic portion includes a first passing region, the base includes a second passing region, and the conductive wire is drawn out from the rear surface of the base through the first passing region and the second passing region.

6 Claims, 7 Drawing Sheets

(51) Int. Cl.
*H01F 27/255* (2006.01)
*B60L 53/30* (2019.01)
*H01F 27/04* (2006.01)
*H02J 7/02* (2016.01)
*H01F 38/14* (2006.01)
*B60L 53/122* (2019.01)
*B60L 53/126* (2019.01)
*H01F 27/06* (2006.01)
*H01F 27/24* (2006.01)
*H01F 27/34* (2006.01)

(52) U.S. Cl.
CPC .............. *H02J 50/12* (2016.02); *H02J 50/70* (2016.02); *H01F 2027/348* (2013.01)

(56) References Cited

U.S. PATENT DOCUMENTS

| | | | |
|---|---|---|---|
| 2012/0187903 A1 | 7/2012 | Tabata et al. | |
| 2012/0187904 A1 | 7/2012 | Tabata et al. | |
| 2013/0106198 A1* | 5/2013 | Kuk | H02J 7/0029 307/104 |
| 2013/0181667 A1 | 7/2013 | Takeshita et al. | |
| 2014/0062393 A1 | 3/2014 | Tabata et al. | |
| 2014/0070766 A1 | 3/2014 | Tabata et al. | |
| 2014/0084697 A1 | 3/2014 | Yasuda et al. | |
| 2014/0091758 A1 | 4/2014 | Hidaka et al. | |
| 2015/0213950 A1 | 7/2015 | Yuasa | |
| 2015/0222017 A1 | 8/2015 | Kumura et al. | |
| 2015/0270717 A1 | 9/2015 | Fujimaki et al. | |
| 2015/0325362 A1 | 11/2015 | Kumura et al. | |
| 2015/0348696 A1 | 12/2015 | Lohr et al. | |
| 2016/0141099 A1 | 5/2016 | Maekawa et al. | |
| 2016/0172896 A1 | 6/2016 | Hidaka et al. | |
| 2017/0076854 A1* | 3/2017 | Tokura | H02J 50/10 |
| 2018/0159372 A1 | 6/2018 | Hidaka et al. | |
| 2018/0175668 A1 | 6/2018 | Hidaka et al. | |
| 2018/0366264 A1* | 12/2018 | Wambugu Ngahu | H01F 38/14 |
| 2018/0375378 A1 | 12/2018 | Hidaka et al. | |

FOREIGN PATENT DOCUMENTS

| | | | | |
|---|---|---|---|---|
| CN | 104823324 A | | 8/2015 | |
| CN | 104937683 A | | 9/2015 | |
| JP | 2006339329 | * | 11/2006 | ......... H01F 17/0013 |
| JP | 2006-339329 A | | 12/2006 | |
| JP | 2006339329 A | * | 12/2006 | |
| JP | 2007-317914 A | | 12/2007 | |
| JP | 2012-089618 A | | 5/2012 | |
| JP | 2012-120411 A | | 6/2012 | |
| JP | 2012-134374 A | | 7/2012 | |
| JP | 2012-175897 A | | 9/2012 | |
| JP | 2012-204469 A | | 10/2012 | |
| JP | 2014-179543 A | | 9/2014 | |
| JP | 2015-012068 A | | 1/2015 | |
| JP | 2015-050261 A | | 3/2015 | |
| JP | 2015-142019 A | | 8/2015 | |
| JP | 2015-144160 A | | 8/2015 | |
| JP | 2016-059174 A | | 4/2016 | |
| WO | 2012/039077 A1 | | 3/2012 | |
| WO | 2015/020141 A1 | | 2/2015 | |

* cited by examiner

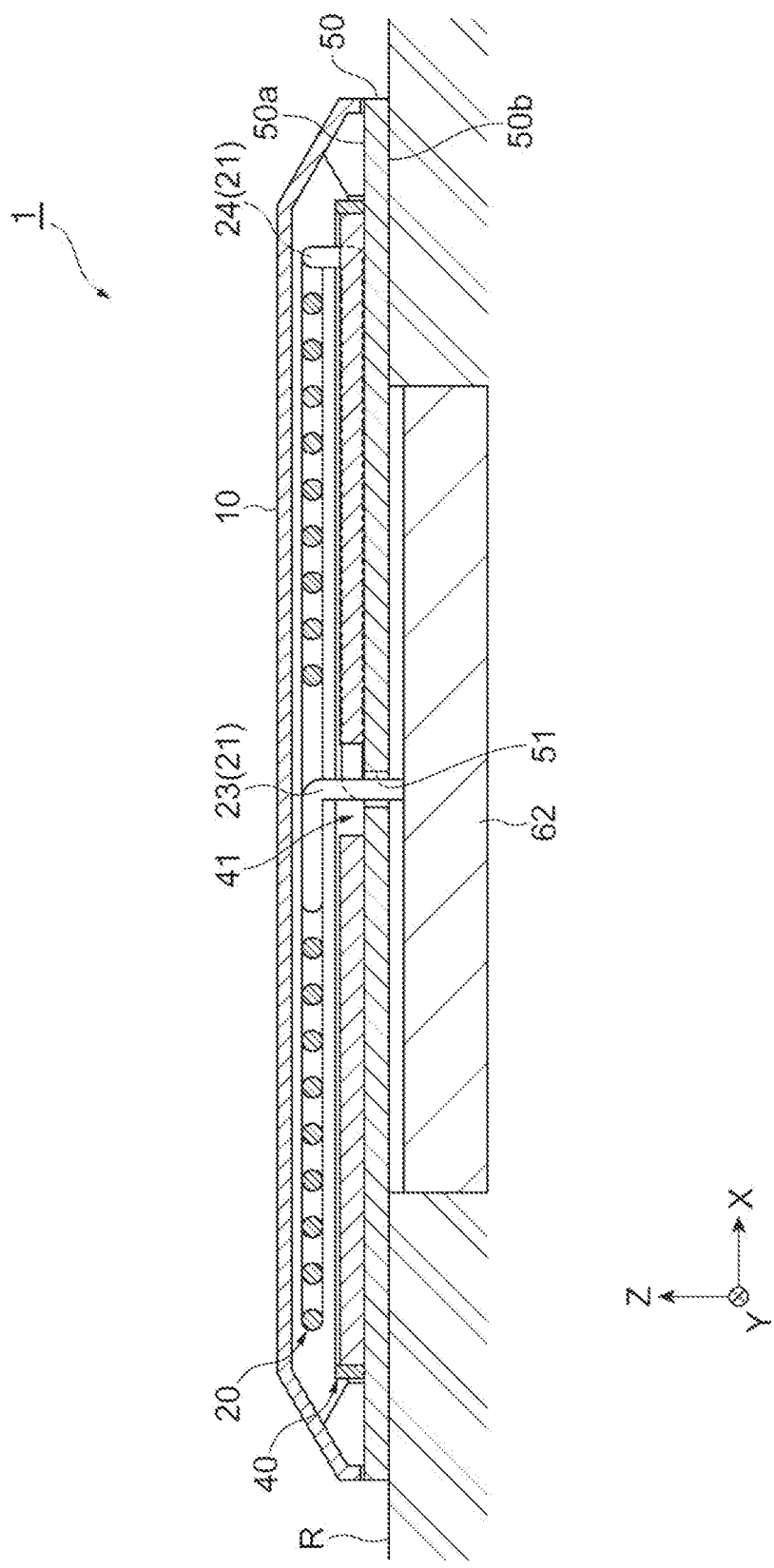

COIL APPARATUS

TECHNICAL FIELD

The present disclosure relates to a coil apparatus.

BACKGROUND ART

Conventionally, a coil apparatus including a base included in an installation surface, a coil portion disposed on a front surface side of the base, and a cover attached to the base to cover the coil portion has been known as a coil apparatus (for example, Patent Document 1). Each of both ends of the coil portion is connected to a conductive wire.

CITATION LIST

Patent Literature

Patent Document 1: International Publication No. 2012/039077

SUMMARY

Technical Problem

In the coil apparatus described above, a conductive wire drawn out from the coil apparatus on the front surface side of the base is led to the outside of the coil apparatus. Therefore, electromagnetic field radiation is generated around the conductive wire on the front surface side of the base. However, considering an influence of electromagnetic field radiation on the surrounding environment, it is desirable to reduce electromagnetic field radiation on the front surface side of the base.

In this regard, the disclosure describes a coil apparatus capable of reducing electromagnetic field radiation on a front surface side of a base.

Solution to Problem

A coil apparatus according to an aspect of the disclosure includes a base having a front surface and a rear surface, a magnetic portion provided on a side of the front surface of the base, and a coil portion provided on an opposite side from the base with respect to the magnetic portion, the coil portion including a conductive wire, wherein the magnetic portion includes a first passing region, the base includes a second passing region, and the conductive wire is drawn out from the rear surface of the base through the first passing region and the second passing region.

Effects

According to an aspect of the disclosure, it is possible to provide a coil apparatus capable of reducing electromagnetic field radiation on a front surface side of a base.

BRIEF DESCRIPTION OF DRAWINGS

FIG. 6 is a cross-sectional view illustrating a state in which the coil apparatus of FIG. 1 is installed on a road surface.

DESCRIPTION OF EMBODIMENTS

Figure 1:
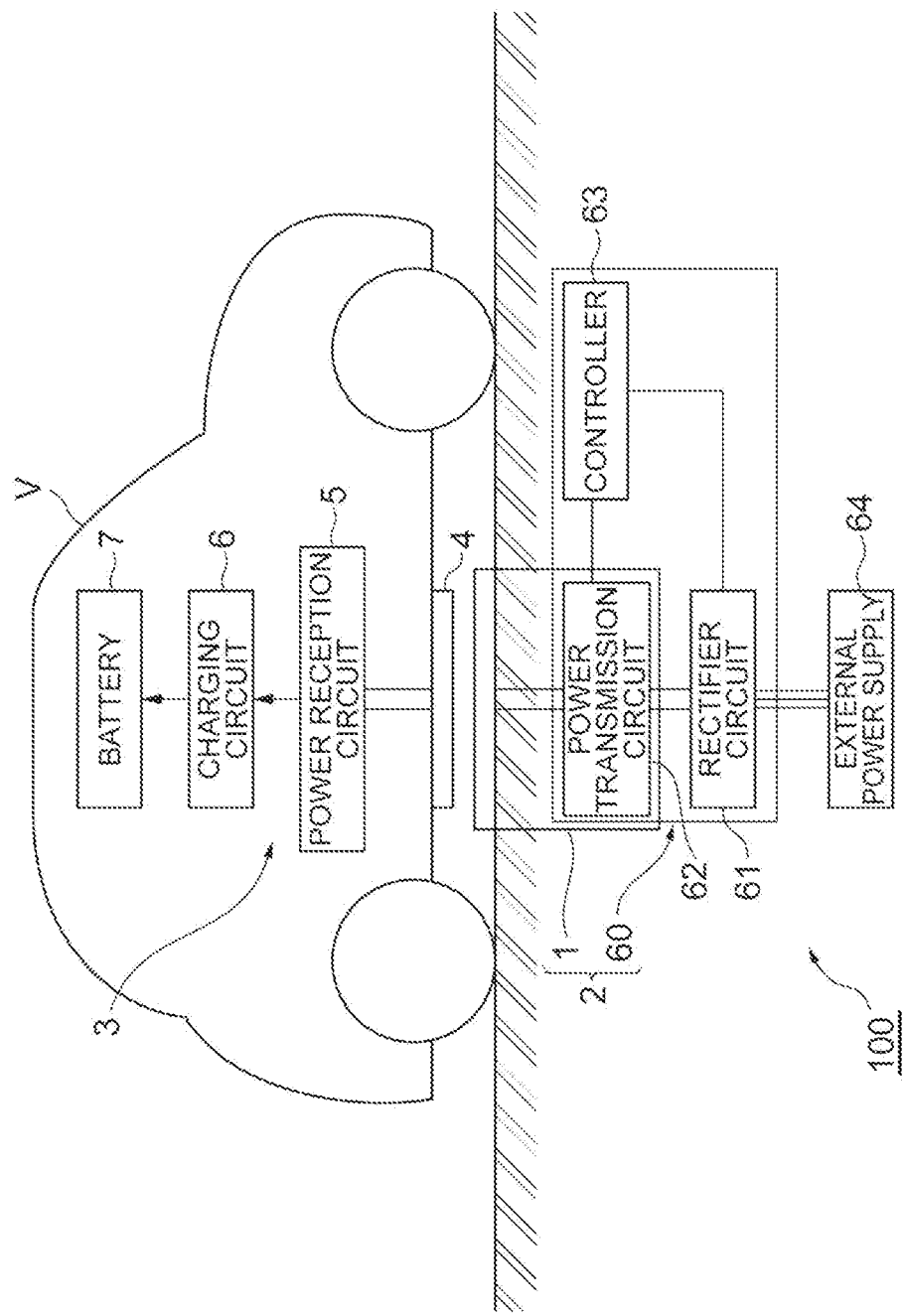
FIG. 1 is a block diagram illustrating a configuration example of a wireless power transfer system including a coil apparatus according to an embodiment.

A coil apparatus according to an aspect of the disclosure includes a base having a front surface and a rear surface, a magnetic portion provided on a side of the front surface of the base, and a coil portion provided on an opposite side from the base with respect to the magnetic portion, the coil portion including a conductive wire, wherein the magnetic portion includes a first passing region, the base includes a second passing region, and the conductive wire is drawn out from the rear surface of the base through the first passing region and the second passing region.

In the coil apparatus, the conductive wire is drawn out not from the front surface of the base but from the rear surface of the base by passing through the first passing region and the second passing region. Electromagnetic field radiation generated around the conductive wire drawn out from the rear surface of the base is shielded by the base. In this way, electromagnetic field radiation generated around the conductive wire drawn out to the rear surface side may be shielded by drawing out the conductive wire from the rear surface. As a result, it is possible to reduce electromagnetic field radiation on the front surface side of the base.

In some aspects, the base may be made of a non-magnetic material. In this case, electromagnetic field radiation generated around the conductive wire drawn out to the rear surface side of the base is easily shielded by the base. For this reason, electromagnetic field radiation propagates less readily to the front surface side of the base. Therefore, it is possible to further reduce electromagnetic field radiation on the front surface side of the base.

In some aspects, the coil portion may be a circular coil.

In some aspects, the first passing region may be provided at a center portion of the magnetic portion, and the second passing region may be provided at a center portion of the base. In this case, the conductive wire of the coil portion may be easily wired so as to pass through the first passing region and the second passing region, and thus it is possible to reduce an extending length of the conductive wire on the front surface side of the base. For this reason, it is possible to further reduce electromagnetic field radiation on the front surface side of the base.

In some aspects, a hole may be formed around the second passing region in the base. In this case, due to the hole, a path length of an eddy current generated around the second passing region increases, and a part of an eddy current generated in the base flows to bypass the hole. That is, the hole functions as an eddy current interrupting portion that interrupts a part of the eddy current generated in the base. Therefore, resistance to the eddy current increases, and thus the magnitude of the eddy current may be reduced.

In some aspects, it is possible to further include a power converter provided on a side of the rear surface of the base.

In this case, it is possible to reduce an extending length of the conductive wire for connecting the coil portion to the power converter. Therefore, it is possible to further reduce electromagnetic field radiation generated around the conductive wire.

Hereinafter, an embodiment of the disclosure will be described with reference to drawings. In description of the drawings, the same element will be denoted by the same reference numeral, and a repeated description will be omitted.

A description will be given of a wireless power transfer system 100 including a coil apparatus according to the present embodiment with reference to FIG. 1. The wireless power transfer system 100 is a system for charging a battery mounted in a vehicle V such as an electric vehicle, a hybrid vehicle, etc.

Figure 2:
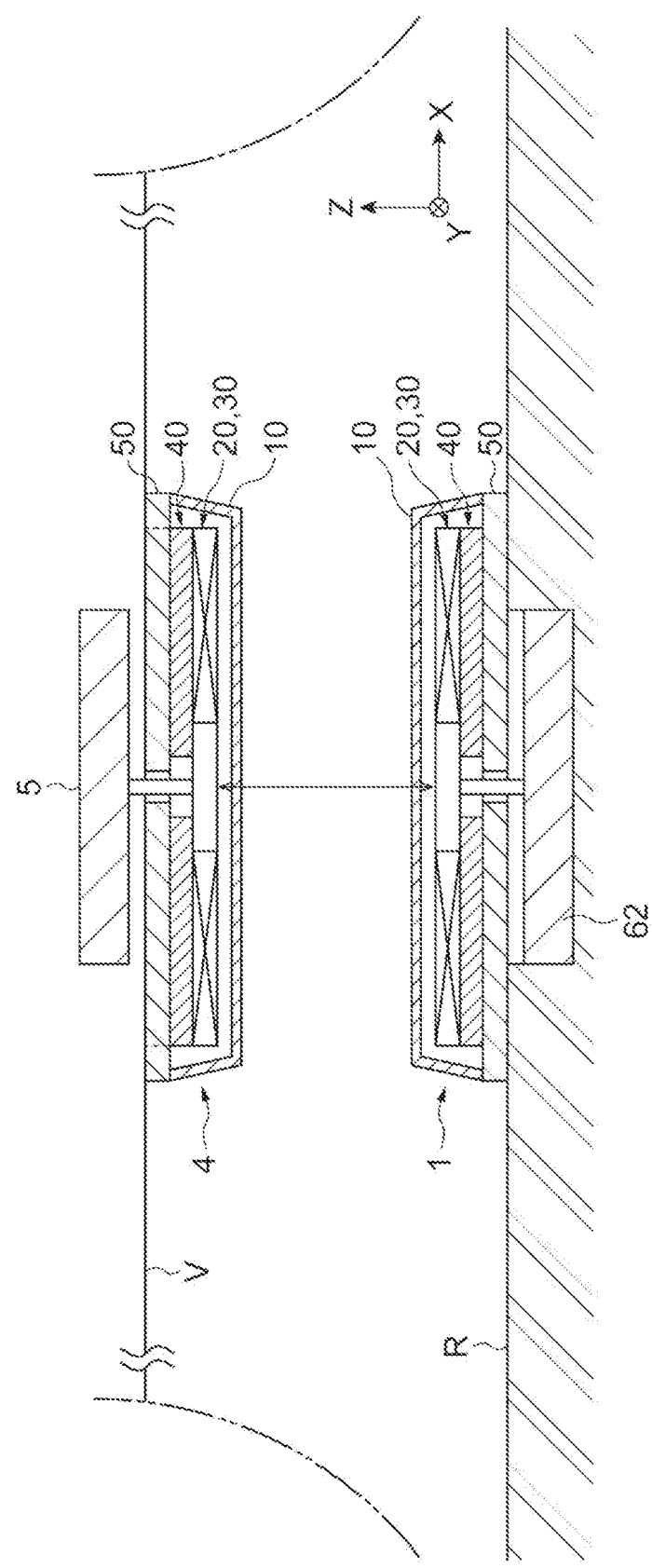
FIG. 2 is a side sectional view illustrating a coil apparatus on a power transmission side and a coil apparatus on a power reception side included in the wireless power transfer system of FIG. 1.

As illustrated in FIG. 1 and FIG. 2, the wireless power transfer system 100 includes a power transmitter 2 installed on a road surface R and a power receiver 3 provided on a vehicle V side. When the vehicle V traveling on a ground is stopped at a predetermined position (a position at which an electromagnetic coupling circuit is formed), the power transmitter 2 wirelessly transmits power (power for charging a battery 7) to the power receiver 3 of the vehicle V.

The power transmitter 2 includes a power transmission coil apparatus (coil apparatus) 1 and a power supply 60 connected to the power transmission coil apparatus 1. The power transmission coil apparatus 1 is installed on the road surface R. The power supply 60 includes a rectifier circuit 61, a power transmission circuit (power converter) 62, and a controller 63. The power supply 60 is connected to an external power supply 64. The external power supply 64 is a power supply for supplying power necessary for generating power to be transmitted to the vehicle V. For example, the external power supply 64 is a power supply that supplies single-phase alternative current (AC) power such as a commercial AC power supply. The external power supply 64 is not limited to a power supply that supplies single-phase AC power, and may be a power supply that supplies three-phase AC power.

The rectifier circuit 61 is a circuit that rectifies AC power supplied from the external power supply 64 and converts the rectified power into direct current (DC) power. The rectifier circuit 61 may have a power factor correction (PFC) function and a step-up/step-down function. A DC power supply such as a fuel cell, a solar cell, etc. may be used as the external power supply 64. In this case, the rectifier circuit 61 may be omitted. When the external power supply 64 is a DC power supply, a DC conversion circuit (DC/DC converter) may be provided instead of the rectifier circuit 61.

A power transmission circuit 62 wirelessly supplies power, which is supplied from the rectifier circuit 61, to the vehicle V through the electromagnetic coupling circuit. The electromagnetic coupling circuit is formed by the power transmission coil apparatus 1 and the power reception coil apparatus 4 provided in the vehicle V. For example, the power transmission circuit 62 includes an inverter circuit. The power transmission circuit 62 supplies DC power from the rectifier circuit 61 to the power transmission coil apparatus 1 while converting the DC power into AC power (high-frequency power) having a higher frequency than that of AC power of the external power supply 64. In this way, wireless power transfer is performed between the power transmission coil apparatus 1 and the power reception coil apparatus 4. The power transmission circuit 62 may include a capacitor on an output side of the inverter circuit. The capacitor is included in a power transmission-side resonance circuit together with a coil 20 (see FIG. 2) included in the power transmission coil apparatus 1. As will be described below, the power transmission circuit 62 in the present embodiment is provided on a rear surface 50b side of a base 50 of the power transmission coil apparatus 1, and is configured as a part of the power transmission coil apparatus 1. The power transmission circuit 62 may be configured separately from the power transmission coil apparatus 1.

For example, the controller 63 is an electronic control unit including a central processing unit (CPU), a read only memory (ROM), a random access memory (RAM), etc. The controller 63 controls power supply from the power transmission coil apparatus 1 to the power reception coil apparatus 4. The controller 63 controls each circuit (the rectifier circuit 61, the power transmission circuit 62, etc.) of the power supply 60 to change the magnitude of power supplied from the power transmission coil apparatus 1 to the power reception coil apparatus 4. For example, when an abnormality occurs in a power reception-side circuit (at least one of the power reception coil apparatus 4, a power reception circuit 5, and a charging circuit 6) or the battery 7, the controller 63 may control each circuit of the power supply 60 to suspend power supply from the power transmission coil apparatus 1 to the power reception coil apparatus 4.

When the power transmission coil apparatus 1 and the power reception coil apparatus 4 are brought close to each other, the coil (coil portion) 20 included in the power transmission coil apparatus 1 and a coil 20 included in the power reception coil apparatus 4 are positioned close to each other. In this way, the electromagnetic coupling circuit is formed. This electromagnetic coupling circuit refers to a circuit in which the coils 20 and 20 are electromagnetically coupled to each other to perform wireless power feeding from the coil 20 on the power transmission side to the coil on the power reception side. The electromagnetic coupling circuit may correspond to a circuit that feeds power using an "electromagnetic induction method" or correspond to a circuit that feeds power using a "magnetic field resonance method".

The vehicle V includes the power receiver 3. Although not illustrated in FIG. 1, the vehicle V includes a component necessary for traveling such as an electric motor, a steering, a brake, etc. The power receiver 3 includes the power reception coil apparatus 4, the power reception circuit 5, and the charging circuit 6. The power reception coil apparatus 4 receives power (AC power) wirelessly supplied from the power transmission coil apparatus 1 on the power transmission side.

The power reception circuit 5 converts AC power from the power reception coil apparatus 4 into DC power and outputs the converted power to the charging circuit 6. The power reception circuit 5 may have a capacitor included in a power reception-side resonance circuit together with the coil 20 on the power reception side.

In the charging circuit 6, an input terminal is connected to an output terminal of the power reception circuit 5, and an output terminal is connected to an input terminal of the battery 7. The charging circuit 6 converts power (DC power) from the power reception circuit 5 into desired power and supplies the converted power to the battery 7. The battery 7 is a rechargeable battery (for example, a secondary battery such as a lithium-ion battery, a nickel-hydrogen battery, etc.) mounted in the vehicle V. The battery 7 supplies power to a drive motor, etc. (not illustrated).

Next, a description will be given of the power transmission coil apparatus 1 and the power reception coil apparatus 4 with reference to FIG. 2 to FIG. 6. In the present embodiment, the power reception coil apparatus 4 is configured similarly to the power transmission coil apparatus 1, and thus a description of the power reception coil apparatus 4 overlapping a configuration of the power transmission coil apparatus 1 will be omitted.

As illustrated in FIG. 2, the power transmission coil apparatus 1 and the power reception coil apparatus 4 are disposed to face each other in a vertical direction (facing direction, Z direction) and to be separated from each other at a predetermined interval. The power transmission coil apparatus 1 is provided to protrude upward from the road surface R. The power transmission coil apparatus 1 has a flat frustum shape or a rectangular parallelepiped shape. The power transmission coil apparatus 1 may be buried in the road surface R without protruding from the road surface R.

Figure 3:
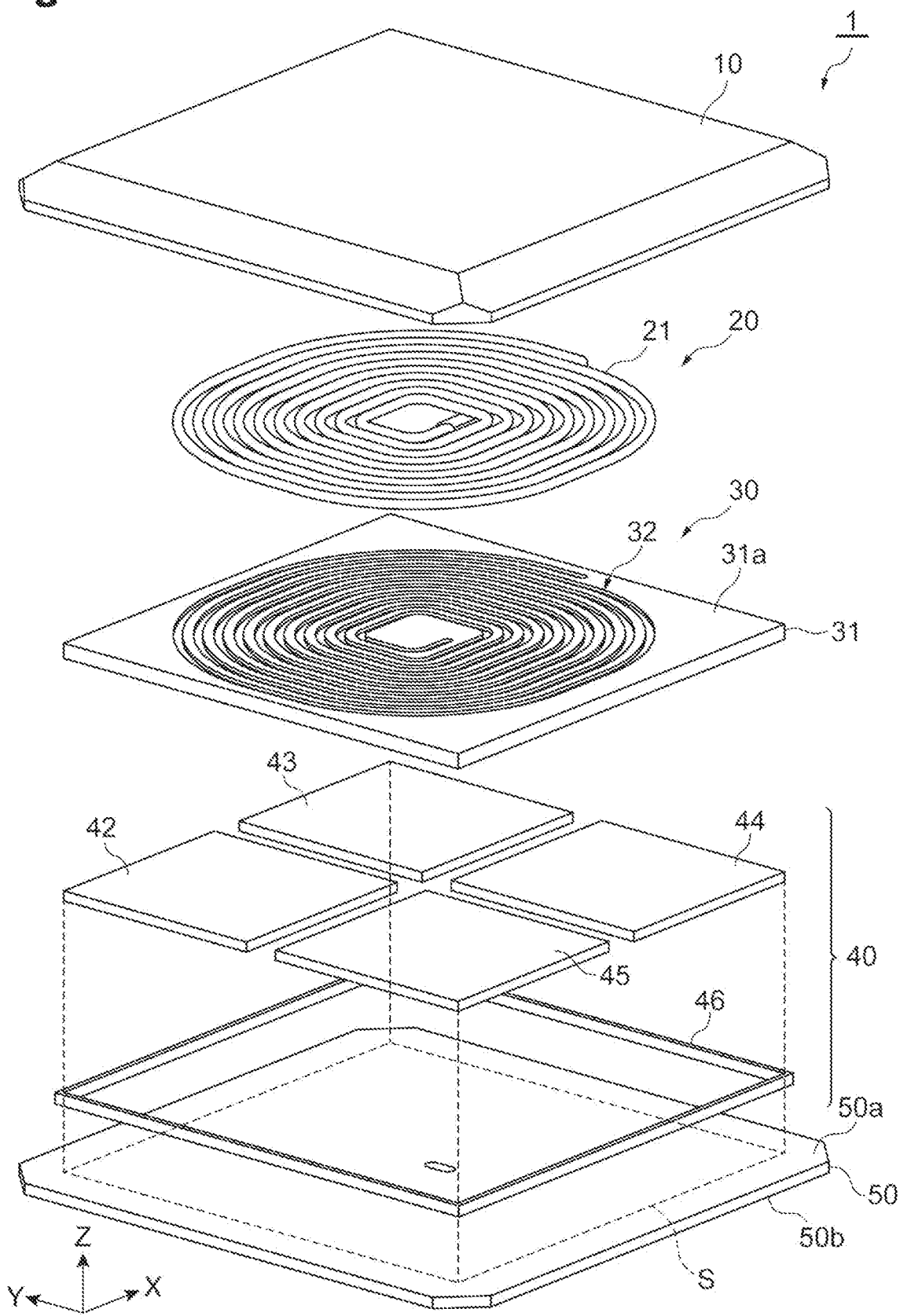
FIG. 3 is an exploded perspective view of the coil apparatus of FIG. 2.

As illustrated in FIG. 3, the power transmission coil apparatus 1 includes a flat rectangular parallelepiped protective cover 10, the coil 20, a holding member 30, a ferrite portion (magnetic portion) 40, and a flat plate base 50. The coil 20, the holding member 30, and the ferrite portion 40 are accommodated in an accommodation space surrounded by the protective cover 10 and the base 50 in order from the protective cover 10 side.

The protective cover 10 protects the coil 20, the holding member 30, and the ferrite portion 40. For example, the protective cover 10 is made of a nonmagnetic and insulating material (for example, polyphenylene sulfide resin, etc.).

The coil 20 is formed by a conductive wire 21 wound in a substantially rectangular spiral shape in the same plane. The coil 20 generates an induced current. The coil 20 is provided on an opposite side to the base 50 with respect to the ferrite portion 40 (that is, the coil 20 is provided on one side of the ferrite portion 40 opposite to the base 50). The coil 20 is a so-called circular coil. The circular coil is a coil in which the conductive wire 21 is wound in a planar spiral shape. The planar spiral shape is a shape in which a conductive wire is wound from the outside to the inside or from the inside to the outside to surround a winding axis. The coil 20 may have a mode in which the conductive wire 21 is wound in a planar spiral shape, and may correspond to a single layer or multiple layers. A shape of the coil 20 viewed from a winding axis direction may correspond to various shapes such as a rectangle, a circle, an ellipse, etc. For example, a litz wire in which a plurality of insulated conductive wires is twisted is used as the conductive wire 21. The conductive wire 21 may correspond to a single wire of copper or aluminum, a bus bar, etc.

Figure 4:
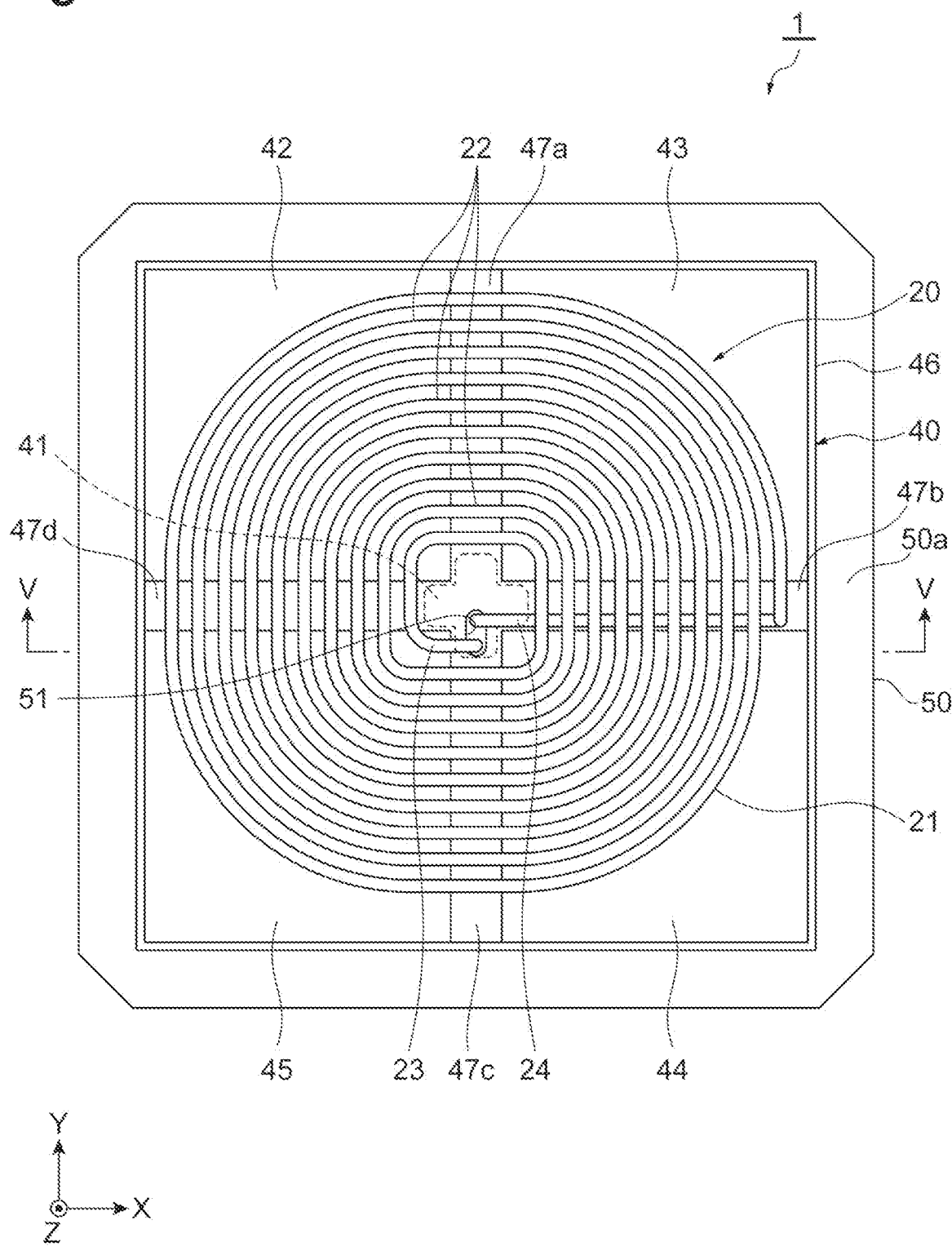
FIG. 4 is a planar view illustrating an internal structure of the coil apparatus of FIG. 2.

As illustrated in FIG. 4, the coil 20 has a coil body 22, an inner lead wire 23, and an outer lead wire 24. In the coil body 22, the conductive wire 21 is wound in a substantially rectangular spiral shape. The inner lead wire 23 is an end portion of the conductive wire 21 drawn out from an innermost peripheral end of the coil body 22. The outer lead wire 24 is an end portion of the conductive wire 21 drawn out from an outermost peripheral end of the coil body 22. In FIG. 4, the holding member 30 is omitted.

Returning to FIG. 3, the holding member 30 is a flat plate member (so-called bobbin) for holding the coil 20. The holding member 30 is disposed between the coil 20 and the ferrite portion 40. The holding member 30 holds the coil 20 by fitting the coil 20 into a groove 32 formed on a front surface 31a of a main body 31. For example, the holding member 30 is integrally formed. A material having an electrical insulation property (for example, silicone, polyphenylene sulfide resin, etc.) is used as a material of the holding member 30.

Figure 5A:
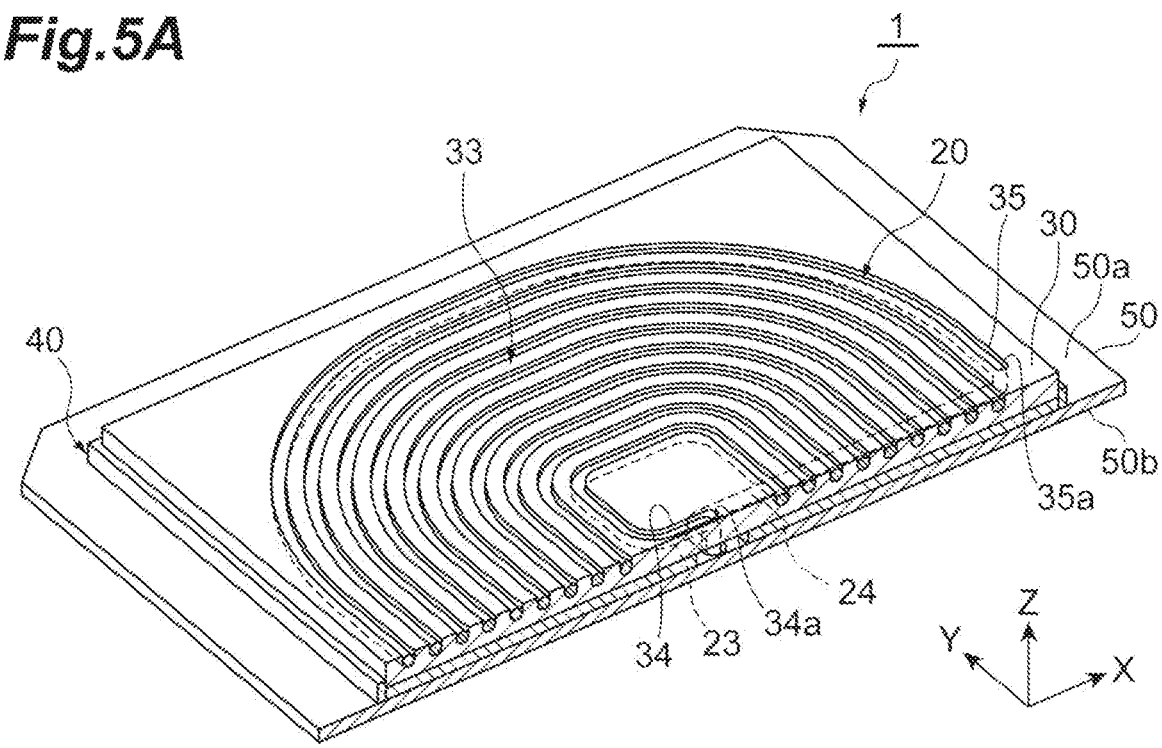
FIG. 5A is perspective cross-sectional view taken along V-V line of FIG. 4.

The groove 32 has a groove shape wound in a substantially rectangular spiral shape when the front surface 31a is viewed in planar view (viewed in a paper penetration direction of FIG. 4, viewed in a Z direction). As illustrated in FIG. 5A, the groove 32 has a groove body 33, an inner lead groove 34, and an outer lead groove 35. The groove body 33 has a substantially rectangular spiral shape and accommodates the coil body 22. The inner lead groove 34 is a portion for drawing out the inner lead wire 23 from the innermost peripheral end of the coil body 22. The outer lead groove 35 is a portion for drawing out the outer lead wire 24 from the outermost peripheral end of the coil body 22. A through-hole 34a into which the inner lead wire 23 is inserted to penetrate the holding member 30 is provided at a terminal end of the inner lead groove 34. A through-hole 35a into which the outer lead wire 24 is inserted to penetrate the holding member 30 is provided at a terminal end of the outer lead groove 35.

Returning to FIG. 3, the ferrite portion 40 has a shape of a flat plate and is located between the holding member 30 and the base 50. The ferrite portion 40 is provided on a front surface 50a side of the base 50. For example, a shape and a size of the ferrite portion 40 are substantially equal to a shape and a size of the holding member 30 in planar view. The shape and the size of the ferrite portion 40 are arbitrarily set as long as the ferrite portion 40 is accommodated in the accommodation space surrounded by the protective cover 10 and the base 50 and may be larger or smaller than the holding member 30.

The ferrite portion 40 includes rectangular plate-shaped ferrite cores 42, 43, 44, and 45 and a rectangular frame-shaped frame body 46. The ferrite cores 42 to 45 are magnetic bodies. The ferrite cores 42 to 45 orient and concentrate magnetic force lines generated from the coil 20. For example, a planar shape of each of the ferrite cores 42 to 45 is a square having a side length shorter than a half length of one side of an inner edge of the frame body 46. The ferrite cores 42 to 45 have the same shape. The planar shape of each of the ferrite cores 42 to 45 is not limited to a square and may be arbitrarily set.

As illustrated in FIG. 3 and FIG. 4, each of the ferrite cores 42 to 45 is arranged to be brought close to each of four corners on the inner side of the frame body 46. The ferrite cores 42 to 45 are separated from each other by a predetermined distance while being arranged inside the frame body 46. A gap 47a is formed between the ferrite cores 42 and 43. A gap 47b is formed between the ferrite cores 43 and 44. A gap 47c is formed between the ferrite cores 44 and 45. A gap 47d is formed between the ferrite cores 45 and 42. The gaps 47a to 47d form rectangular regions and are continuous with each other in a central region 41 at a center portion of the ferrite portion 40. The central region 41 is provided in the ferrite portion 40. That is, the ferrite portion 40 includes the central region 41. The gaps 47a to 47d may be filled with a filler. A small member (for example, a block shape, a granular shape, etc.) of the same material as that of the ferrite cores 42 to 45, resin, etc. may be used as the filler. When the gaps 47a to 47d are filled with the filler, it is possible to suppress change of arrangement of the ferrite cores 42 to 45.

Returning to FIG. 3, the base 50 ensures strength of the power transmission coil apparatus 1 and shields an outward flow of a leakage magnetic flux. The base 50 is made of a nonmagnetic and electrically conductive material (for example, aluminum, copper, etc.). The base 50 is provided between the ferrite portion 40 and the road surface R (that is, on the rear surface side of the power transmission coil apparatus 1). The base 50 has the front surface 50a and the rear surface 50b. The base 50 may include a single plate material or a combination of a plurality of plate materials.

As illustrated in FIG. 3 and FIG. 6, the base 50 protrudes to an outside of a rectangular region in which the ferrite portion 40 is provided in an X direction and a Y direction. In other words, the base 50 protrudes outward from an outer peripheral portion of the ferrite portion 40 over a whole circumference. In this way, when the ferrite portion 40 is projected in a Z direction, the base 50 covers a projection region S (see FIG. 3). An area of the base 50 is larger than a projected area (area of the projection region S) of the ferrite portion 40 in the Z direction.

The base 50 shields electromagnetic field radiation generated around the conductive wire 21 of the coil 20. It is considered that since the coil 20 is disposed on the front surface 50a of the base 50, electromagnetic field radiation is likely to occur around the conductive wire 21 on the front surface 50a side. When the conductive wire 21 (the inner lead wire 23 and the outer lead wire 24) is drawn out from the rear surface 50b, it is possible to shield electromagnetic field radiation generated around the conductive wire 21 drawn out to the rear surface 50b side. As a result, it is possible to reduce electromagnetic field radiation on the front surface 50a side of the base 50.

Figure 5B:
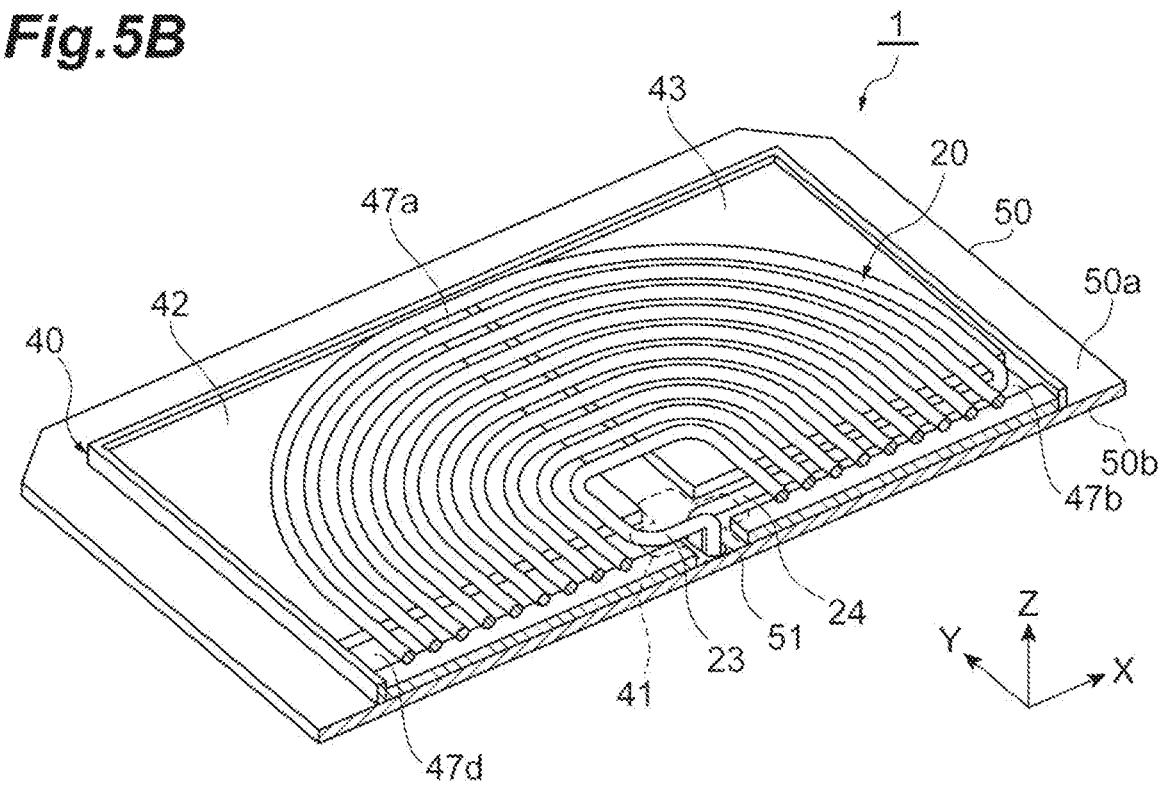
FIG. 5B is perspective cross-sectional view taken along V-V line of FIG. 4.

As illustrated in FIG. 4 and FIG. 5B, the base 50 is provided with a through-hole 51 through which the inner lead wire 23 and the outer lead wire 24 passing through the central region 41 of the ferrite portion 40 are passed. That is, the base 50 includes the through-hole 51. The through-hole 51 is provided at the center portion of the base 50. The through-hole 51 is a through-hole into which the inner lead wire 23 and the outer lead wire 24 can be inserted. For example, the through-hole 51 is a long hole which is long in one direction along an XY plane (Y direction in the present embodiment).

In the power transmission coil apparatus 1 configured as described above, as illustrated in FIG. 6, the inner lead wire 23 extends in the X direction along the inner lead groove 34 of the holding member 30. The inner lead wire 23 is bent at a substantially right angle to be directed in a thickness direction of the holding member 30. The inner lead wire 23 extends in the Z direction to penetrate the holding member 30 through the through-hole 34a. The inner lead wire 23 passes through the central region 41 of the ferrite portion 40, penetrates the through-hole 51 of the base 50, and reaches the rear surface 50b of the base 50.

The outer lead wire 24 extends in the Y direction along the outer lead groove 35 of the holding member 30. The outer lead wire 24 is bent at a substantially right angle to be directed in the thickness direction of the holding member 30. The outer lead wire 24 extends in the Z direction to pass through the holding member 30 through the through-hole 35a. The outer lead wire 24 is bent at a substantially right angle to be directed in a longitudinal direction (X direction) of the gap 47b. The outer lead wire 24 passes through a space of the gap 47b on the rear surface side (the side opposite to the front surface 31a) of the holding member 30. The outer lead wire 24 reaches the central region 41 which is above the through-hole 51 of the base 50. The outer lead wire 24 is bent at a substantially right angle to be directed in the thickness direction of the base 50. The outer lead wire 24 penetrates the base 50 through the through-hole 51 and reaches the rear surface 50b of the base 50.

In this way, the inner lead wire 23 and the outer lead wire 24 are led to the rear surface 50b side of the base 50 through the central region 41 of the ferrite portion 40 and the through-hole 51 of the base 50. That is, in the present embodiment, the central region 41 is a first passing region through which the conductive wire 21 of the coil 20 passes, and the through-hole 51 is a second passing region through which the conductive wire 21 passing through the first passing region passes. Drawing out the conductive wire 21 from the rear surface 50b of the base 50 through the central region 41 and the through-hole 51 includes not only a mode of drawing out the conductive wire 21 inside the power transmission coil apparatus 1 from the rear surface 50b but also a mode of drawing the conductive wire outside the power transmission coil apparatus 1 into the power transmission coil apparatus 1 from the rear surface 50b. In addition, a conductive wire connected to the conductive wire 21 forming the coil 20 is included in "the conductive wire 21 of the coil 20 drawn out from the rear surface 50b" as well as the conductive wire 21 forming the coil 20 itself. In other words, the through-hole 51 may correspond to the second passing region through which the conductive wire outside the power transmission coil apparatus 1 is drawn in from the rear surface 50b. The central region 41 may correspond to the first passing region through which the conductive wire passing through the second passing region passes.

As described above, in the power transmission coil apparatus 1, the conductive wire 21 is drawn out not from the front surface 50a of the base 50 but from the rear surface 50b of the base 50 by passing through the central region 41 and the through-hole 51. Electromagnetic field radiation generated around the conductive wire 21 drawn out from the rear surface 50b of the base 50 is shielded by the base 50. In this way, electromagnetic field radiation generated around the conductive wire 21 drawn out to the rear surface 50b side may be shielded by drawing out the conductive wire 21 from the rear surface 50b. As a result, it is possible to reduce electromagnetic field radiation on the front surface 50a side of the base 50.

In the power transmission coil apparatus 1, the base 50 is made of a non-magnetic material. In this way, electromagnetic field radiation generated around the conductive wire 21 drawn out to the rear surface 50b side of the base 50 is easily shielded by the base 50. For this reason, electromagnetic field radiation propagates less readily to the front surface 50a side of the base 50. Therefore, it is possible to further reduce electromagnetic field radiation on the front surface 50a side of the base 50.

In the power transmission coil apparatus 1, the central region 41 is provided at the center portion of the ferrite portion 40, and the through-hole 51 is provided at the center portion of the base 50. In this way, the conductive wire 21 of the coil 20 may be easily wired so as to pass through the central region 41 and the through-hole 51, and thus it is possible to reduce an extending length of the conductive wire 21 on the front surface 50a side of the base 50. For this reason, it is possible to further reduce electromagnetic field radiation on the front surface 50a side of the base 50. In the power transmission coil apparatus 1, the inner lead wire 23 may be drawn out of the power transmission coil apparatus 1 without the inner lead wire 23 crossing the coil body 22, and thus it is possible to reduce a thickness of the power transmission coil apparatus 1 when compared to a case in which the inner lead wire 23 crosses the coil body 22 and the inner lead wire 23 is drawn out from an outermost circumferential side of the coil 20.

In other words, in the power transmission coil apparatus 1, the inner lead wire 23 and the outer lead wire 24 are drawn out to penetrate a coil structural material. Therefore, a handling property of the inner lead wire 23 and the outer lead wire 24 is improved when compared to a conventional structure. The thickness of the power transmission coil apparatus 1 is reduced when compared to a structure in which the conductive wire is drawn out from an upper surface. An efficiency reduction is prevented by drawing the inner lead wire 23 and the outer lead wire 24 out of the power transmission coil apparatus 1 in a shortest distance.

In the power transmission coil apparatus 1, the power transmission circuit 62 is provided on the rear surface 50b side of the base 50 and is configured as a part of the power transmission coil apparatus 1. In this way, it is possible to shorten the extending length of the conductive wire 21 for connecting the coil 20 to the power transmission circuit 62. Therefore, it is possible to further reduce electromagnetic field radiation generated around the conductive wire 21.

In the power transmission coil apparatus 1, both the inner lead wire 23 and the outer lead wire 24 are drawn out to the rear surface 50b side of the base 50 through the common first passing region and second passing region. In this way, in the first passing region and the second passing region, a direction of a current flowing through the inner lead wire 23 and a direction of a current flowing through the outer lead wire 24 are opposite to each other. As a result, it is possible to cancel a magnetic field generated around the inner lead wire 23 and a magnetic field generated around the outer lead wire 24.

Figure 7:
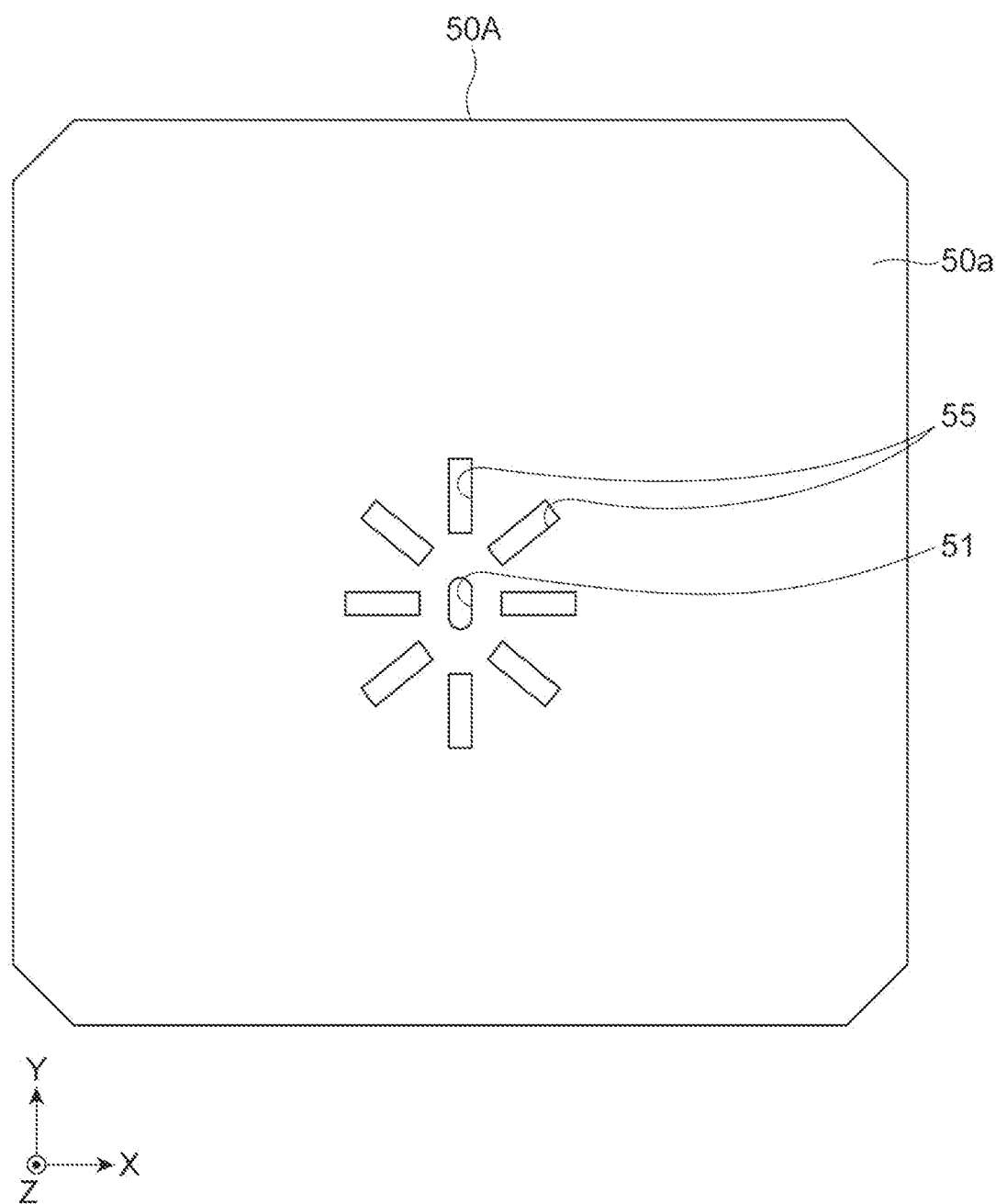
FIG. 7 is a planar view of a base according to a modification.

Even though one embodiment of the disclosure has been described above, the invention is not limited to the embodiment. For example, as illustrated in FIG. 7, the base 50 may be modified into a base 50A. The base 50A is different from the base 50 in that a plurality of holes 55 is formed around the through-hole 51. The plurality of holes 55 corresponds to a substantially rectangular long hole penetrating the base 50A and radially extending with the through-hole 51 as a center around the through-hole 51. A shape and a position of each of the holes 55 are not particularly limited. The hole 55 may correspond to a recess not penetrating the base 50A. Only one hole 55 may be formed.

According to such a base 50A, the hole 55 increases a path length of an eddy current generated around the through-hole 51 and diverts a part of the eddy current. That is, the hole 55 functions as an eddy current interrupting portion that interrupts a part of the eddy current generated in the base 50A. Therefore, resistance to the eddy current increases, and thus the magnitude of the eddy current may be reduced. The eddy current interrupting portion is a portion that interrupts and diverts a part of the eddy current generated in the base 50A and changes a state of the eddy current. Various forms may be adopted for the hole 55, as long as the hole 55 interrupts a part of the eddy current generated around the through-hole 51 to divert the eddy current and change a state of the eddy current when compared to a case in which the hole 55 is absent. The hole 55 may correspond to a through-hole penetrating the base 50A or a depressed recess not penetrating the base 50A.

In the above embodiment, the central region 41 corresponding to the first passing region is provided at the center portion of the ferrite portion 40, and the through-hole 51 corresponding to the second passing region is provided at the center portion of the base 50. That is, a position of the central region 41 and a position of the through-hole 51 overlap each other in the vertical direction (Z direction). However, the position of the central region 41 and the position of the through-hole 51 may not overlap each other in the vertical direction (Z direction).

In the above embodiment, both the inner lead wire 23 and the outer lead wire 24 are drawn out to the rear surface 50b side of the base 50 through the common first passing region and second passing region. However, the invention is not limited to this example. Specifically, the first passing region through which the inner lead wire 23 passes and the first passing region through which the outer lead wire 24 passes may be separately provided. The second passing region through which the inner lead wire 23 passes and the second passing region through which the outer lead wire 24 passes may be separately provided, the inner lead wire 23 and the outer lead wire 24 passing through the first passing region.

In the above embodiment, the holding member 30 holds the coil 20 by the coil 20 fit into the groove 32 formed on the front surface 31a of the main body 31. The holding member 30 is not limited to a mode in which the coil 20 is held by the groove 32. For example, the holding member 30 may have a flat plate shape or a frame body shape. The holding member 30 may have a mode in which the coil 20 is held by anchoring the conductive wire 21 to be wound in a planar spiral shape using an adhesive, potting, etc. in the flat plate shape or the frame body.

In the above embodiment, the ferrite portion 40 includes the plurality of ferrite cores 42 to 45. The ferrite portion 40 may include a different number of ferrite cores. The ferrite portion 40 may include one ferrite core.

In the above embodiment, as the first passing region, the central region 41 is provided using a gap in which the ferrite cores 42 to 45 are not present in the ferrite portion 40. The first passing region may be provided at a position at which the ferrite cores 42 to 45 are present. In this case, when a through-hole into which the inner lead wire 23 and the outer lead wire 24 can be inserted is formed in the ferrite cores 42 to 45, the through-hole may function as the first passing region.

In the above embodiment, the first passing region is provided at the center portion of the ferrite portion 40. The first passing region may be provided at a portion other than the center portion of the ferrite portion 40. For example, the first passing region may be provided within a range of the projection region S obtained by projecting the ferrite portion 40 in the Z direction on the base 50. In this case, since the area of the base 50 is wider than the area of the projection region S, it is possible to provide the second passing region for passing the conductive wire 21 passing through the first passing region immediately below the first passing region in the base 50.

In the above embodiment, the power transmission coil apparatus 1 used for the wireless power transfer system 100 for charging the battery 7 mounted in the vehicle V has been described as an example. However, the invention is not limited to this mode. For example, the power transmission coil apparatus 1 of the disclosure may be applied to a coil apparatus used for a wireless power transfer system for charging a battery of a movable object other than the vehicle such as an underwater vehicle. Alternatively, the power transmission coil apparatus 1 of the disclosure may be applied to a coil apparatus used for a system that directly supplies power to a component consuming power such as an electric motor, a sensor, etc. Further, in the above embodiment, a description has been given of a case in which the coil apparatus of the disclosure is applied as the power transmission coil apparatus 1 of the wireless power transfer system 100. However, the invention is not limited to this example. For example, the coil apparatus of the disclosure may be applied as a coil apparatus of an inducting heating system or an eddy current flaw detection system.

INDUSTRIAL APPLICABILITY

According to some aspects of the disclosure, it is possible to provide a coil apparatus capable of reducing electromagnetic field radiation on a front surface side of a base.

REFERENCE SIGNS LIST

1: power transmission coil apparatus (coil apparatus)
4: power reception coil apparatus
20: coil (coil portion)
21: conductive wire
40: ferrite portion (magnetic portion)
41: central region (first passing region)
50, 50A: base
50a: front surface
50b: rear surface
51: through-hole (second passing region)
55: hole
62: power transmission circuit (power converter)

The invention claimed is:

1. A coil apparatus comprising:
a base having a front surface and a rear surface;
a magnetic portion provided on a side of the front surface of the base; and
a coil portion provided on an opposite side from the base with respect to the magnetic portion, the coil portion including a conductive wire,
wherein the magnetic portion includes a first passing region,
the base includes a second passing region,
the conductive wire is drawn out from the rear surface of the base through the first passing region and the second passing region,
the base is provided with a first hole as the second passing region through which the conductive wire passing through the first passing region of the magnetic portion is passed, and
a second hole different from the first hole is formed around the first hole in the base.

2. The coil apparatus according to claim 1, further comprising a power converter provided on a side of the rear surface of the base.

3. The coil apparatus according to claim 1, wherein the base is made of an electrically conductive material.

4. The coil apparatus according to claim 1, wherein the base is made of a non-magnetic material.

5. The coil apparatus according to claim 1, wherein the coil portion is a circular coil.

6. The coil apparatus according to claim 1,
wherein the first passing region is provided at a center portion of the magnetic portion, and
the second passing region is provided at a center portion of the base.

* * * * *